United States Patent
Byagowi et al.

(10) Patent No.: US 11,556,382 B1
(45) Date of Patent: Jan. 17, 2023

(54) HARDWARE ACCELERATED COMPUTE KERNELS FOR HETEROGENEOUS COMPUTE ENVIRONMENTS

(71) Applicant: Meta Platforms, Inc., Menlo Park, CA (US)

(72) Inventors: Ahmad Byagowi, Fremont, CA (US); Michael Maroye Lambeta, Mountain View, CA (US); Martin Mroz, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 312 days.

(21) Appl. No.: 16/508,106

(22) Filed: Jul. 10, 2019

(51) Int. Cl.
*G06F 9/48* (2006.01)
*G06F 9/50* (2006.01)
*G06F 1/26* (2006.01)

(52) U.S. Cl.
CPC .............. *G06F 9/4893* (2013.01); *G06F 1/26* (2013.01); *G06F 9/48* (2013.01); *G06F 9/4806* (2013.01); *G06F 9/4843* (2013.01); *G06F 9/4881* (2013.01); *G06F 9/50* (2013.01); *G06F 9/5005* (2013.01); *G06F 9/5027* (2013.01); *G06F 9/5094* (2013.01)

(58) Field of Classification Search
CPC ........ G06F 9/48; G06F 9/4806; G06F 9/4843; G06F 9/4881; G06F 9/4893; G06F 9/50; G06F 9/5005; G06F 9/5027; G06F 9/5044; G06F 9/5094; G06F 1/26
See application file for complete search history.

(56) References Cited

U.S. PATENT DOCUMENTS

| | | |
|---|---|---|
| 5,946,219 A | 8/1999 | Mason |
| 7,716,497 B1 | 5/2010 | Trimberger |
| 2003/0086300 A1 | 5/2003 | Noyes |
| 2011/0185092 A1* | 7/2011 | Boers .................. H04W 4/80 455/41.2 |
| 2014/0082629 A1 | 3/2014 | Ash |
| 2015/0058857 A1* | 2/2015 | Sandstrom ............ G06F 9/5038 718/103 |
| 2015/0127834 A1* | 5/2015 | Udupi ................... G06F 9/5044 709/226 |
| 2016/0350146 A1* | 12/2016 | Udupi ................... G06F 9/5027 |
| 2017/0116701 A1* | 4/2017 | Acharya ................. G06F 9/48 |
| 2017/0262567 A1 | 9/2017 | Vassiliev |
| 2018/0024861 A1* | 1/2018 | Balle .................... G06F 3/065 718/104 |
| 2018/0121250 A1 | 5/2018 | Qi |

(Continued)

OTHER PUBLICATIONS

Ghasemazar et al, "Minimizing the Power Consumption of a Chip Multiprocessor under an Average Throughput Constraint", 1th Int'l Symposium on Quality Electronic Design, 2010, IEEE, pp. 362-371 (Year: 2010).*

*Primary Examiner* — Charles M Swift
(74) *Attorney, Agent, or Firm* — Van Pelt, Yi & James LLP (57) ABSTRACT

A request to perform a compute task is received. A plurality of compute processor resources eligible to perform the compute task is identified, wherein the plurality of compute processor resources includes two or more of the following: a field-programmable gate array, an application-specific integrated circuit, a graphics processing unit, or a central processing unit. Based on an optimization metric, one of the compute processor resources is dynamically selected to perform the compute task.

20 Claims, 7 Drawing Sheets

(56) References Cited

U.S. PATENT DOCUMENTS

| | | | |
|---|---|---|---|
| 2018/0150298 A1* | 5/2018 | Balle | G06F 3/065 |
| 2019/0026150 A1* | 1/2019 | Shimamura | G06F 9/5038 |
| 2019/0050263 A1* | 2/2019 | Patel | G06F 9/5044 |
| 2019/0138890 A1 | 5/2019 | Liang | |
| 2019/0227843 A1* | 7/2019 | Custodio | G06F 9/505 |
| 2019/0317802 A1 | 10/2019 | Bachmutsky | |
| 2019/0324856 A1 | 10/2019 | Zhao | |
| 2020/0174838 A1* | 6/2020 | Li | G06F 9/545 |
| 2020/0233717 A1* | 7/2020 | Smith | G06F 9/505 |
| 2020/0301722 A1 | 9/2020 | Li | |

\* cited by examiner

HARDWARE ACCELERATED COMPUTE KERNELS FOR HETEROGENEOUS COMPUTE ENVIRONMENTS

BACKGROUND OF THE INVENTION

Data centers are facilities used to store computer systems and components, such as data storage systems and their associated components. Modern data centers are typically large facilities whose computer systems are used to store large amounts of data and perform compute tasks on such data. The tremendous increase in the generation and consumption of data in recent times has been a catalyst for the utilization of more and more data centers to store and process these vast amounts of data. One challenge associated with performing compute tasks in data center environments is selecting compute resources. Many types of compute resources may be utilized in data center environments.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A server system that includes a plurality of compute processor resources is disclosed. The disclosed server system includes a processor configured to: receive a request to perform a compute task, identify a plurality of compute processor resources eligible to perform the compute task (wherein the plurality of compute processor resources includes two or more of the following: a field-programmable gate array (FPGA), an application-specific integrated circuit (ASIC), a graphics processing unit (GPU), or a central processing unit (CPU)), and, based on an optimization metric, dynamically select one of the compute processor resources to perform the compute task. The disclosed server system also includes the compute processor resources, including two or more of the following: an FPGA, an ASIC, a GPU, or a CPU.

A practical and technological benefit of this server system is the flexibility to use a variety of compute processor resources that are tailored to handle different types of compute tasks. Algorithms that are used very frequently can justify the cost of a custom ASIC solution that achieves significantly better performance than a general compute solution, such as a CPU. On the other hand, algorithms that are used very rarely do not justify the substantial non-recurring engineering (NRE) costs and development (e.g., design, validation, deployment, etc.) time associated with ASICs. General compute solutions, such as CPUs, are better suited for these compute tasks.

FPGAs, which perform better than CPUs, present a compute alternative to accelerate algorithms which are not used frequently enough to justify the cost of a custom ASIC solution but do occur frequently enough such that the server system benefits from a specially designed hardware implementation. Certain classes of highly-parallelizable data center compute tasks, e.g., signal processing, image processing and machine learning, can be efficiently implemented on FPGAs. Furthermore, FPGAs can handle a variety of specialized tasks that do not justify ASIC solutions because FPGAs are reprogrammable (e.g., they can physically transform to implement different functions/algorithms on the fly). They can even be reallocated (e.g., reprogrammed) to dynamically meet computing demands. GPUs are similar to FPGAs in that they have performance advantages over CPUs and do not require the substantial NRE costs and development time associated with ASICs. GPUs are particularly suited to compute tasks that can take advantage of data linearization.

In some embodiments, the same algorithm can be implemented using a variety of compute processor resources. For example, a frequently used algorithm can be implemented as an ASIC solution. In addition, that algorithm can be written in a hardware description language to run on an FPGA (e.g., to meet demand exceeding that which ASICs implementing the algorithm can provide). Furthermore, the algorithm can be written in a high-level programming language to run on a CPU (e.g., to run on CPUs if ASICs and FPGAs are occupied). In this heterogeneous compute environment, execution of compute requests for such an algorithm are self-contained and stateless. Stated alternatively, sending a compute request for the algorithm to an FPGA yields the same results as sending the algorithm to an ASIC, CPU, etc. A scheduler of compute task requests would thus be agnostic to the hardware implementing a function/algorithm.

An example of a type of compute task that can be implemented using a variety of compute processor resources is graphics interchange format (GIF) resizing (e.g., resizing a small thumbnail GIF). GIF resizing can take a long time for processing on a traditional CPU (e.g., several tens of seconds), so an FPGA implementation can provide significant system benefits if GIF resizing occurs frequently enough. If GIF resizing is used very frequently, an ASIC implementation may also be justified. Other examples of compute tasks that the system could handle include video encoding, natural language processing (NLP), artificial intelligence (AI) inference, complex arithmetic, model fitting, data compression, encryption, hashing, Fast Fourier Transform (FFT), and fuzzy logic hardware accelerator (FLHA) compute tasks, other image/video/audio related compute tasks, and any other compute tasks.

In some embodiments, the system includes a plurality of application programming interface (APIs), a scheduler/router, and a plurality of compute processor resources (e.g., ASICs, FPGAs, GPUs, and CPUs). The APIs expose the compute processor resources to users (e.g., various software applications) that would like to use the compute processor resources for compute tasks. In various embodiments, the APIs receive requests to perform various compute tasks (e.g., execute various algorithms, wherein different algorithms are programmed on different compute processor resources and exposed to users via different APIs). The scheduler/router is responsible for receiving inbound requests, queuing them as necessary, and delivering them to appropriate interface software (interfacing with the compute processor resources). In various embodiments, the interface software is capable of, when given a suitably structured request, executing a function on a compute processor resource and returning resulting data.

In various embodiments, when an API request is received by the scheduler/router, it passes it on for execution to a compatible, available service. In some embodiments, the service is part of the interface software. In the case of an FPGA, an appropriate bitstream is loaded to the FPGA. In the case of a GPU/CPU device, a computer program is loaded to execute the request. In the case of an ASIC, which only performs a single function, minimal configuration is required. The appropriate driver for the compute processor resource transmits the request data to the compute processor resource, the compute task is performed, and, once ready, the resulting data is read back and returned to the scheduler/router.

In various embodiments, the initialization process for the system is as follows: power is applied and the host operating system loads, the scheduler/router is loaded, available compute processor resources are enumerated, and available service descriptions are loaded. For FPGAs, the lifecycle of an FPGA includes being powered down, being powered up and programmed (with a service mapped to the FPGA), potentially being dynamically reconfigured, and being powered down again. Programming an FPGA requires a non-trivial amount of time. Thus, initial allocation of FPGAs to functions/algorithms performed by the FPGAs influences overall system performance. Examples of initial configuration strategies include: keeping all FPGAs powered down and unprogrammed (not allocated) until a first compute request is received, allocating a specified number of FPGAs before the first compute request (e.g., one FPGA per API), and allocating all FPGAs before the first compute request (e.g., allocated across APIs uniformly or according to a distribution based on use statistics).

From a high-level perspective, the system exposes API endpoints to customers/users defined in the same way as existing remote procedure calls (RPCs) for services (e.g., REST, Thrift, gRPC, and similar models). Data dependencies are encoded within the request and all data is returned in the response, thereby yielding a stateless system. The system is therefore agnostic to the language, operating system, and conditions of the API customer, and independent of the physical location where systems are deployed. Scheduling/routing is performed by mapping incoming API requests to available FPGAs that implement the relevant functions (e.g., algorithms). In various embodiments, metrics are collected to inform subsequent scheduling/routing efforts. For example, a cost function can include such metrics as how much energy was expended executing the request, how well the work was performed, and latency and average execution durations. This configuration enables disaggregation of nodes across racks, pods, and data centers, and service requests can be intelligently mapped to nodes configured to accept the incoming function signatures.

Reallocation of FPGAs resources can be made based on usage statistics collected over time. For example, suppose FPGAs are configured to expose two different APIs (API A and API B). The scheduler/router can collect statistics on the proportion of calls to API A versus API B. If API A is called only occasionally while API B is called frequently, the scheduler/router can update the allocation such that more FPGAs are programmed to implement the function associated with API B than API A. This may involve reprogramming devices previously allocated. The scheduler/router may also leave FPGAs unallocated for either power management (due to low utilization) or as backups to swap in. In some embodiments, a function repository is available to nodes for dynamic provisioning in which objects contain bitstreams and characteristic metadata. Based on geographical load and resources the repository of functions can be uniquely tailored.

In the heterogeneous compute environment described herein, certain compute tasks may only be programmed on certain hardware resources, which can be taken into consideration by the scheduler/router when assigning compute tasks to hardware resources. For example, if GIF resizing occurs very frequently, it may be determined that it should only be implemented on ASICs and that enough ASICs should be deployed to meet a large demand. Furthermore, some functions/algorithms have higher performance gains associated with certain compute processor resources (e.g., due to the parallelization achievable on the different types of compute processor resources), making those compute processor resources particularly suited for those functions/algorithms.

In various embodiments, the scheduler/router determines which type of compute processor resource to use for each compute request. A cost function can be used to determine which compute resource to use. For example, power of computation could be included in a cost function (e.g., optimizing for watts per computation). Power consumption per computation could be calculated based on computation time and average power consumption of various compute processor resources (e.g., cost=power*time). Delay in returning results to a user can also be included in the cost function. Taking this into consideration, in some embodiments, if there is an idle compute processor resource that can handle a compute request, use of that resource first would likely minimize the delay. If there are no idle resources, then the delay may be calculated by multiplying expected execution time for the compute task by queue depth (number of compute task requests already placed) for each of the occupied resources. In some embodiments, delay in returning results and power consumption are both included in a cost function (e.g., assigned weights and summed).

In some embodiments, to select a compute processor resource for a compute request, the lowest cost function resource is depleted first. For example, suppose that multiple GIF resizing requests are made and that CPU, GPU, FPGA, and ASIC resources are all available. If the cost function includes power consumption and delay in returning results as inputs and ASICs are the most power efficient and lowest delay resource, then all ASICs implementing GIF resizing would be used first. After ASICs are used, then, for example, FPGAs, GPUs, and CPUs may be used, assuming FPGAs, GPUs, and CPUs have the next lowest cost functions in that order. In some embodiments, this could mean queueing up the ASICs first, then FPGAs, etc. If needed later, the queue may be reshuffled if, for example, the FPGAs are dynamically reallocated for another function/algorithm. In some embodiments, a global optimization is performed to minimize a cost function that considers a plurality of compute requests being serviced by the server system. In some embodiments, services that are not cost effective are deallocated, but some availability (e.g., for FPGAs) may be kept due to the high cost of reprogramming should demand go up again.

Figure 1:
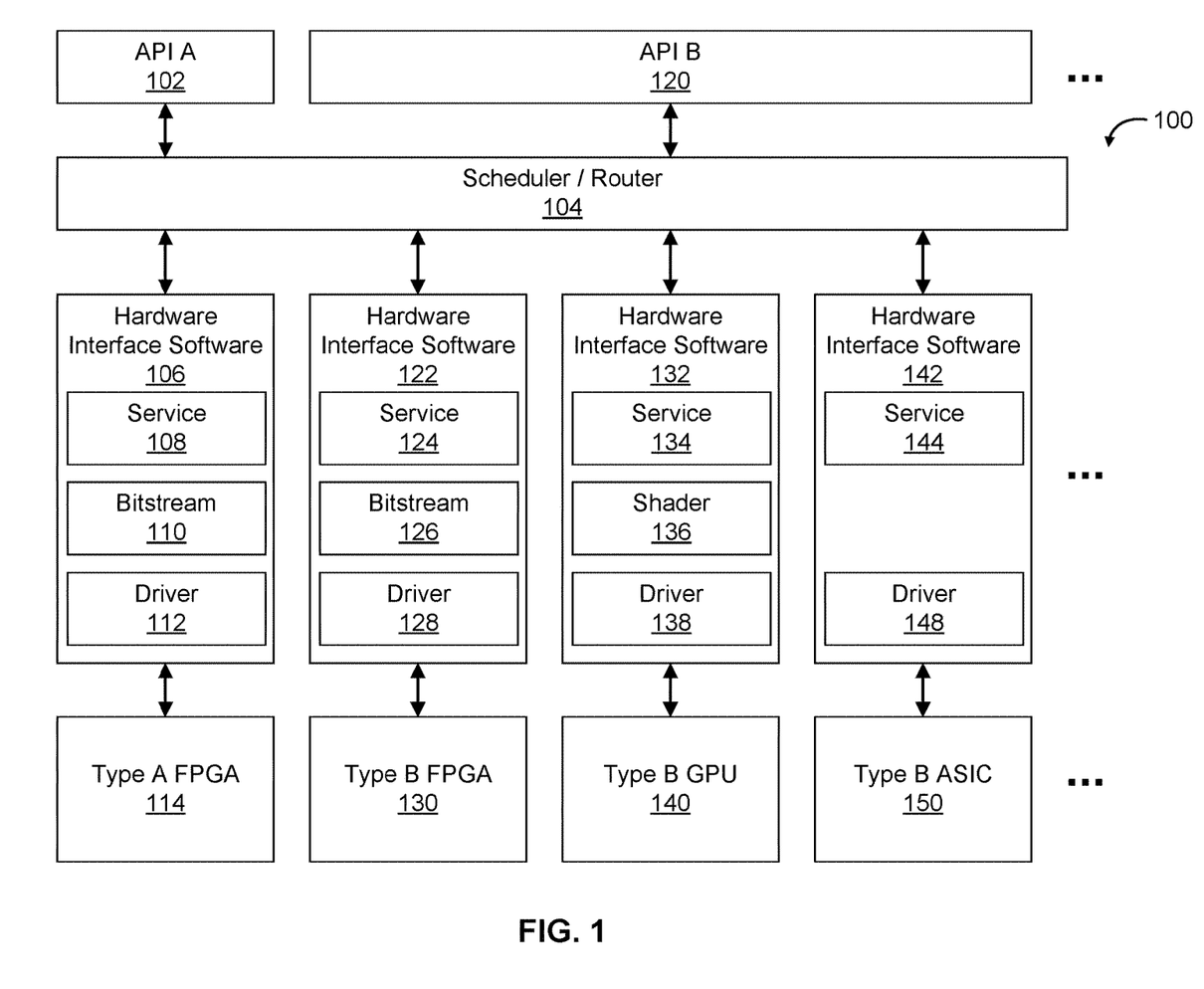
FIG. 1 is a block diagram illustrating an embodiment of a server system that includes a plurality of compute processor resources.

FIG. 1 is a block diagram illustrating an embodiment of a server system that includes a plurality of compute processor resources. In the example shown, server system 100 includes API A 102, scheduler/router 104, hardware interface software units 106, 122, 132, and 142, Type A FPGA 114, Type B FPGA 130, Type B GPU 140, and Type B ASIC 150. In the example shown, each hardware interface software unit includes a service. Hardware interface software for FPGAs include a bitstream and driver. Hardware interface software for GPUs include a shader and driver. Hardware interface software for ASICs include a driver. Each hardware interface software unit is mapped to a compute processor resource (e.g., FPGA, GPU, ASIC, etc.) and an API type. For example, hardware interface software 106 is mapped to API A 102 and Type A FPGA 114. If API A 102 receives a certain type of function call (e.g., resizing GIFs), hardware interface software 106 is configured to handle that type of function call and Type A FPGA 114 is configured to implement that type of function call (e.g., resizing GIFs). This means that service 108, bitstream 110, and driver 112 are configured to handle that type of function call (e.g., resizing GIFs).

In the example shown, API B 120 would receive a different type of function call. In the example shown, Type B FPGA 130, Type B GPU 140, and Type B ASIC 150 implement the function associated with API B 120 and hardware interface software units 122, 132, and 142 are configured for the function call associated with API B 120.

In the example illustrated in FIG. 1, different APIs are exposed to users for different compute requests. It is also possible to instead use a single API that is configured to receive a variety of compute requests. A plurality of scheduler/routers may be used with this single API approach. For example, the single API (e.g., an API gateway) may forward compute requests to schedulers/routers mapped to compute processor resources based on what functions the compute processor resources implement. Stated alternatively, each scheduler/router may be configured to handle queuing, data transfer to/from compute processor resources, and communication with the API gateway for one type of compute task. It is also possible to use a single scheduler/router with a single API. In this scenario, the single scheduler/router determines where compute requests are sent based on its knowledge of which compute processor resources implement which functions. This information about the compute processor resources may be communicated to the scheduler/router as information from services mapped to the compute processor resources. It is also possible for different APIs to be exposed for different compute tasks and use a dedicated scheduler/router for each API. In all of these scenarios, there is a defined API endpoint for receiving multiple types of compute requests and a mechanism for directing these compute requests to the appropriate compute processor resources.

In the example shown, API A 102, API B 120, scheduler/router 104, and the hardware interface software units comprise server system 100's software layer, and the compute processor resources (Type A FPGA 114, Type B FPGA 130, Type B GPU 140, and Type B ASIC 150) comprise server system 100's hardware layer. Examples of software components in FIG. 1 (e.g., API A 102, scheduler/router 104, service 108, bitstream 110, and driver 112) include any software system, component, process, and/or application. The example shown is illustrative and not restrictive. Additional hardware interface software units and compute processor resources may be present. CPUs (not shown in this example) may also be present.

In the example illustrated in FIG. 1, API A 102 and API B 120 interface with scheduler/router 104. API A 102 and API B 120 also interface with users/customers of server system 100. API A 102 and API B 120 are where a compute request from a user is initially received and they are the user's interface for receiving a response/output data associated with the compute request. By using an API approach, compute processor resource capabilities can be presented to users via high-level programming languages. In some embodiments, APIs are defined in the same way as traditional RPC models. Examples of RPC models include REST, Thrift, and gRPC. A customer program (customer in the sense of requesting services) of API A 102 or API B 120 may send a request message to API A 102 or API B 120 with appropriate arguments and data and then wait for a message containing the results of an executed compute on the data.

For example, with respect to GIF resizing, the customer program may send a desired resulting GIF size argument as well as a GIF image. The result returned would be a GIF image that is the desired resulting GIF size. Other examples of compute task requests include video encoding, natural language processing (NLP), artificial intelligence (AI) inference, complex arithmetic, model fitting, data compression, encryption, hashing, Fast Fourier Transform (FFT), and fuzzy logic hardware accelerator (FLHA) compute tasks, other image/video/audio related compute tasks, and any other compute tasks. In various embodiments, scheduler/router 104 determines how the requests are handled.

In various embodiments, a function repository (e.g., implementing the above functions) is available to FPGA nodes for dynamic provisioning in which objects contain bitstreams and characteristic metadata. Based on geographical load and resources, the repository of functions may be uniquely tailored. In various embodiments, when an FPGA service is initialized, it is bound to one of the FPGA devices attached to the system, the FPGA is initially unprogrammed, and the service reads an FPGA bitstream from persistent storage and transfers it to the corresponding FPGA to make the service ready to accept requests.

In the example illustrated in FIG. 1, scheduler/router 104 interfaces with API A 102 and API B 120. Scheduler/router 104 receives user compute requests passed on from an API. Scheduler/router 104 also passes the results of compute task processing back to the requesting API. Scheduler/router 104 is configured to determine which compute processor resources are available to perform a compute task and which compute processor resources have been configured to handle which types of compute tasks. For example, if a GIF resizing request is received, scheduler/router 104 would be able to determine whether FPGAs, ASICs, GPUs, CPUs, etc. implement GIF resizing and which specific compute processor resources implement GIF resizing and the statuses of those compute processor resources (e.g., available, occupied, etc.). In some embodiments, scheduler/router 104 assigns the compute task to a first available compute processor resource implementing the relevant function. If there are no currently available compute processor resources implementing the relevant function, scheduler/router 104 may queue the compute task with an occupied compute processor resource, choosing from among a plurality of compute processor resources according to an optimization metric (e.g., a load balancing metric).

In addition to load balancing considerations, scheduler/router 104 may also consider where compute processor resources are located when assigning compute tasks. In some embodiments, compute processor resources in server system 100 are located across different servers. In these embodiments, routing functionality of scheduler/router 104 may be used to route traffic to compute processor resources on multiple servers. If all compute processor resources in server system 100 are located on a single server, then no routing functionality is needed and scheduler/router 104 only requires scheduling functionality. If servers on which compute processor resources reside are located in different server clusters, a higher-level routing architecture may be used.

Figure 2:
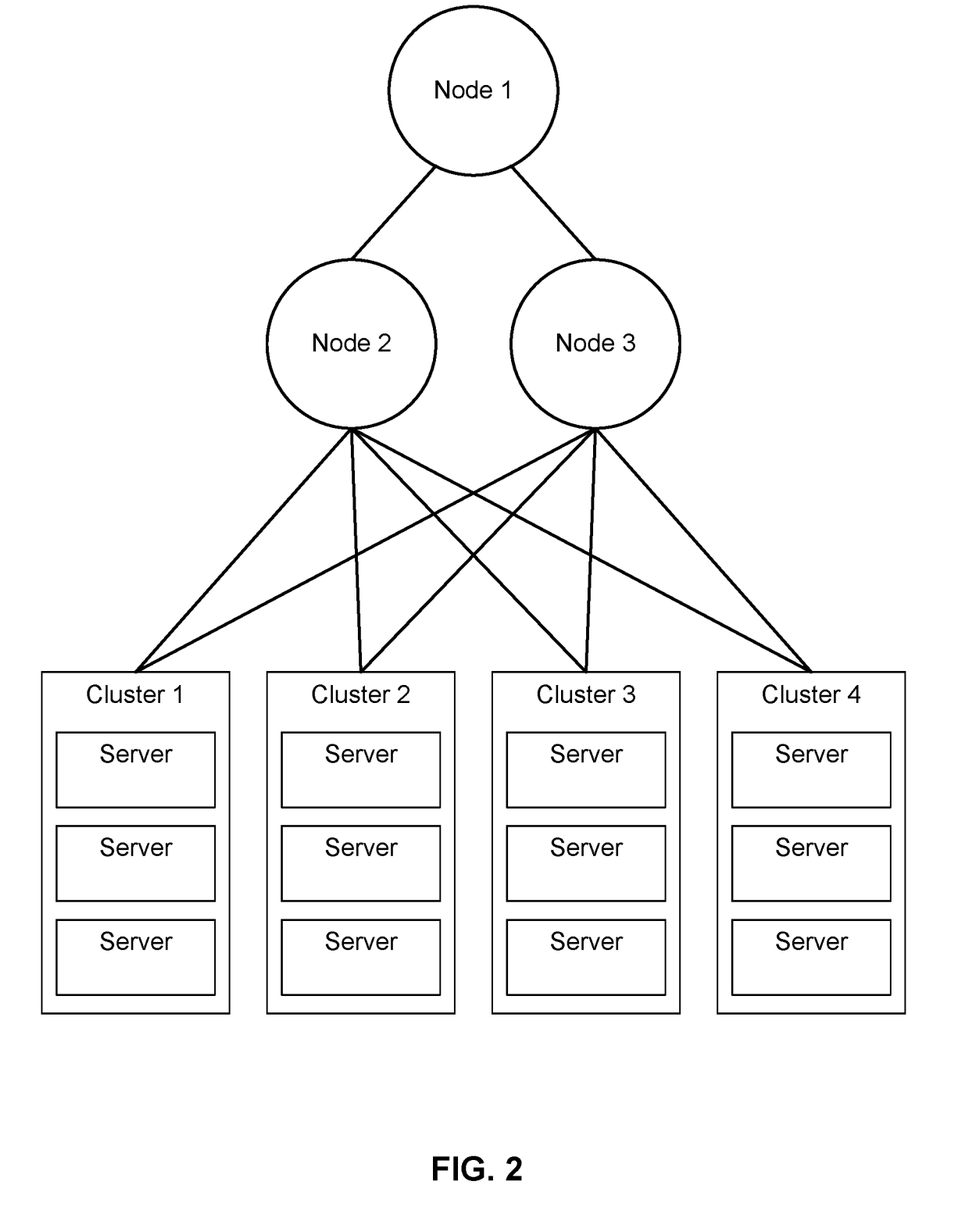
FIG. 2 illustrates an example network architecture in which servers (on which compute processor resources reside) are located in different server clusters.

FIG. 2 illustrates an example network architecture in which servers (on which compute processor resources reside) are located in different server clusters. In the example shown, servers (with compute processor resources implementing various functions) are located in four server clusters. A master scheduler/router that interfaces with an API (e.g., API A 102 or API B 120 of FIG. 1) may be located in Node 1. In order to efficiently route traffic to the four server clusters, an additional routing layer (Node 2 and Node 3) may be added. In the example shown, this additional routing layer is fully interconnected with the server clusters (e.g., Node 2 and Node 3 have connections to all four of the server clusters). Node 2 and Node 3, as well as each server in each cluster, may include a scheduler/router that coordinates with the master scheduler/router and/or other schedulers/routers in the network architecture.

Returning to the example illustrated in FIG. 1, hardware interface software 106 serves as a communication conduit between scheduler/router 104 and Type A FPGA 114. In the example shown, other hardware interface software/FPGA stacks in server system 100 also communicate with scheduler/router 104. As described above, compute processor resources (and thus their associated hardware interface software) may be located on a single server, on different servers in a single server cluster, on different servers in different server clusters, etc. The various compute processor resources implement various functions that a user could request, with the specific distribution of implemented functions across compute processor resources based at least in part on demand for those functions. In various embodiments, when scheduler/router 104 assigns a compute task to a compute processor resource (e.g., Type A FPGA 114), a request that is still in a software format (e.g., RPC format) is forwarded to hardware interface software (e.g., hardware interface software 106). The hardware interface software (e.g., hardware interface software 106) then converts the request into a format compatible with the compute processor resource (e.g., Type A FPGA 114).

In the example illustrated in FIG. 1, hardware interface software units mapped to an FPGA include a service, bitstream, and driver. For example, hardware interface software 106 includes service 108, bitstream 110, and driver 112. Service 108 is software that decodes a request message (e.g., an RPC message) and sends it to Type A FPGA 114 after the request message is converted by driver 112 into a format compatible with FPGA 114. Bitstream 110 is software that determines the function that Type A FPGA 114 implements. This information is needed by scheduler/router 104 in order for scheduler/router 104 to match FPGAs with compute requests. In various embodiments, bitstream 110 and other bitstreams send information on what compute tasks FPGAs are configured to handle to scheduler/router 104. Driver 112 is software that structures the request message received by service 108 into a format that Type A FPGA 114 can use to perform the requested compute task. The components of hardware interface software 122 (service 124, bitstream 126, and driver 128) perform the above for Type B FPGA 130.

In the example illustrated in FIG. 1, hardware interface software units mapped to a GPU include a service, shader, and driver. For example, hardware interface software 132 includes service 134, shader 136, and driver 138. Service 134 is software that decodes a request message (e.g., an RPC message) and sends it to Type B GPU 140 after the request message is converted by driver 138 into a format compatible with Type B GPU 140. Shader 136 is software that performs specialized operations (e.g., related to shading, special effects, and other image and video processing) as required for specific graphics compute tasks. Driver 138 is software that structures the request message received by service 132 into a format that Type B GPU 140 can use to perform the requested compute task. Stated alternatively, driver 138 handles communication with Type B GPU 140.

In the example illustrated in FIG. 1, hardware interface software units mapped to an ASIC include a service and driver. For example, hardware interface software 142 includes service 144 and driver 148. Service 144 is software that decodes a request message (e.g., an RPC message) and sends it to Type B ASIC 150 after the request message is converted by driver 148 into a format compatible with Type B ASIC 150. In contrast to an FPGA, an ASIC does not need a bitstream because the ASIC is permanently configured to perform one type of compute task. Driver 148 is software that structures the request message received by service 142 into a format that Type B ASIC 150 can use to perform the requested compute task. Stated alternatively, driver 148 handles communication with Type B ASIC 150.

In various embodiments, after a compute processor resource performs the requested compute task, the results of the compute are transferred back to the corresponding service, which then constructs an API response object to be sent back to scheduler/router 104, which then sends the response object back to API 102 and to the user. At this point, the service is ready to accept the next request for use of the compute processor resource. Services are mapped one-to-one to compute processor resources (e.g., service 108 mapped to Type A FPGA 114). Stated alternatively, when a service is initialized, it is bound to a compute processor resource. FIGS. 4-7 provide additional details associated with performing a compute task using a compute processor resource, from identifying a service to perform a compute task to invoking the service to reporting results of the compute task.

In the example illustrated in FIG. 1, FPGAs are a type of compute processor resource that perform compute tasks. In various embodiments, the FPGAs are implemented as integrated circuits that include arrays of logic blocks that are programmable using a hardware description language (HDL). Examples of HDLs include VHDL and Verilog. The reprogrammable nature of FPGAs allows FPGAs the flexibility to be reconfigured to handle different specialized compute tasks as needed, which is not possible with other hardware technologies, such as ASICs. In addition, FPGAs can be more efficient than CPUs because FPGAs can structure computation in a more parallel manner. For example, an FPGA that implements GIF resizing may be able to try 128-256 resize combinations at once because it can implement 128-256 resizing hardware cores instead of perhaps 4 resize combinations from a 4-core CPU. An FPGA is initially unprogrammed when it is powered on. In various embodiments, the service bound to an FPGA device reads an FPGA bitstream from persistent storage and transfers it to the FPGA, thus initializing the FPGA and making it ready to accept compute requests. In various embodiments, ASICs are implemented as specially designed integrated circuits that are not reprogrammable. GPUs and CPUs are microprocessors that are reprogrammable using high-level computer programming languages.

In some embodiments, the initialization process for the system is as follows: power is applied and a host operating system loads, scheduler/router 104 is loaded, available compute processor resources are enumerated, and available service descriptions are loaded. At this point, FPGAs are powered down and unprogrammed. In various embodiments, the lifecycle of an FPGA includes being powered down, being powered up and programmed (with a service mapped to the FPGA), potentially being dynamically reconfigured, and being powered down again. Programming an FPGA requires a non-trivial amount of time. Thus, initial allocation of FPGAs to functions/algorithms performed by the FPGAs influences overall system performance. Examples of initial configuration strategies include: keeping all FPGAs powered down and unprogrammed (not allocated) until a first compute request is received, allocating a specified number of FPGAs before the first compute request (e.g., one FPGA per API), and allocating all FPGAs before the first compute request (e.g., allocated across APIs uniformly or according to a distribution based on use statistics). ASICs are not reprogrammable, so no initial allocation strategy is required for ASICs. GPUs and CPUs do not require programming and are ready to accept any compute request after power is applied to the overall server system.

Scheduler/router 104 may also allocate (e.g., program) an unallocated (e.g., unprogrammed) FPGA to perform a specified compute task that is in high demand. Hardware interface software (e.g., a service, bitstream, and driver) would be instantiated and mapped to an allocated FPGA. The function/algorithm a newly allocated FPGA is assigned to perform can depend on a variety of metrics. Examples of these metrics include queue depth and execution time. With respect to queue depth, an FPGA may be assigned to perform a function/algorithm with longer incoming queues (indicating higher demand) on already allocated FPGAs. With respect to execution time, an FPGA may be assigned to perform a function/algorithm whose outstanding compute requests are taking a longer time to execute than compute requests for other functions/algorithms. ASICs do not need to be allocated because they cannot be reprogrammed.

When all FPGA resources have already been allocated, some FPGA resources may be reallocated (e.g., redirected to handle compute tasks that are in high demand). As with allocation of unallocated FPGA resources, reallocation of FPGA resources can depend on metrics such as queue depth and execution time. For example, if one group of FPGAs that implements a particular function has a significantly higher queue depth than other groups of FPGAs, FPGAs from the other groups may be reallocated to implement the function of the group of FPGAs with the higher queue depth in order to balance queue depths across FPGA groups. ASICs cannot be reallocated because they cannot be reprogrammed.

In the example illustrated in FIG. 1, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. The number of components and the connections shown in FIG. 1 are merely illustrative. For example, more APIs, hardware interface software units, and compute processor resources than what is shown may exist. Components not shown in FIG. 1 may also exist. For example, CPU resources may also exist. As described above, implementations with a single API gateway and/or multiple scheduler/router units are also possible. In addition, different hardware interface software unit/FPGA stacks may be located in different geographic locations, and the scheduler/router may implement multiple layers of scheduling/routing.

FIG. 2 illustrates an example network architecture in which servers (on which compute processor resources reside) are located in different server clusters. FIG. 2 is discussed above with respect to the server system example of FIG. 1.

Figure 3:
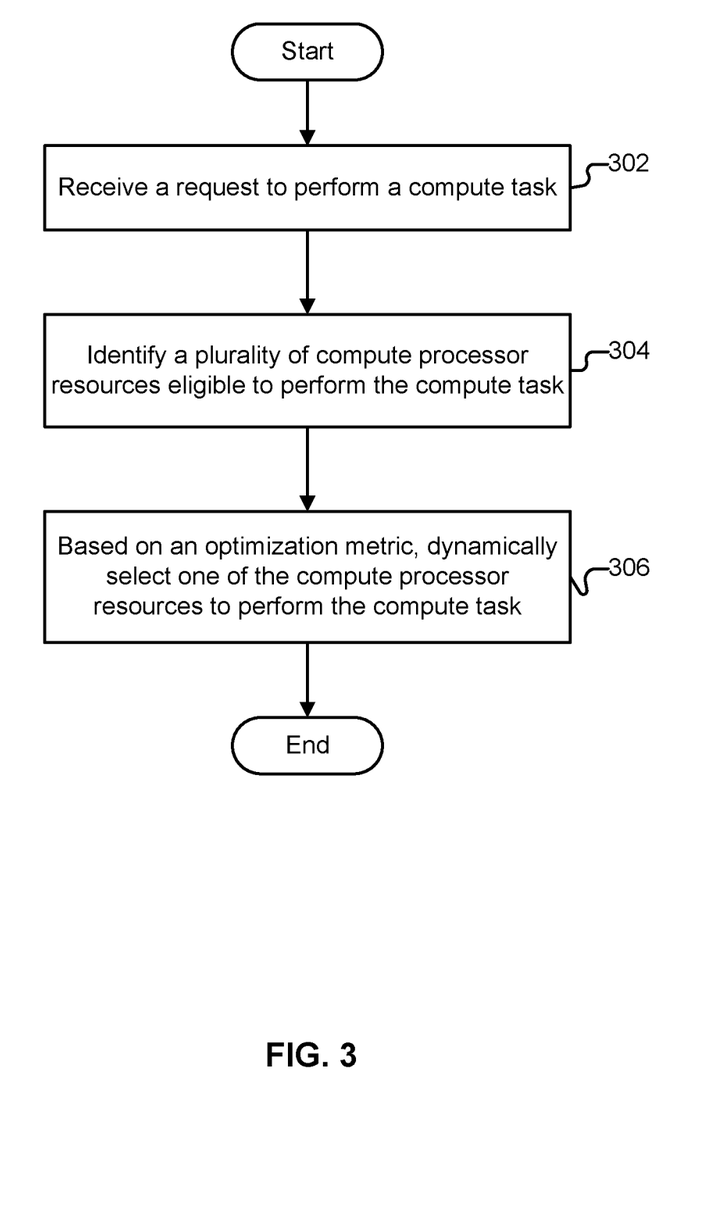
FIG. 3 is a flowchart illustrating an embodiment of a process for dynamically selecting a compute processor resource from among a plurality of compute processor resources.

FIG. 3 is a flowchart illustrating an embodiment of a process for dynamically selecting a compute processor resource from among a plurality of compute processor resources. In some embodiments, this process is performed by scheduler/router 104 of FIG. 1.

At 302, a request to perform a compute task is received. In some embodiments, the request originates from a customer/user that is exposed to an API endpoint (e.g., API A 102 or API B 120 of FIG. 1). The customer/user may be a software program that invokes other ancillary software programs (e.g., via APIs). The customer/user software may request some type of compute task to return a compute result by making a function call to the API (e.g., making a library function call). In various embodiments, the customer/user is not aware of the implementation details associated with returning the compute result. For example, if the customer/user invokes a function, e.g., GIF_output=resizeGIF (GIF_input, result_size), the customer/user expects a new GIF image (GIF_output) that is resized from an initial GIF image (GIF_input) and resized to a new size (result_size).

The customer/user may not have visibility into the compute processor resource that performs the processing (e.g., FPGA, ASIC, GPU, CPU, etc.).

At 304, a plurality of compute processor resources eligible to perform the compute task are identified, wherein the plurality of compute processor resources includes two or more of the following: an FPGA, an ASIC, a GPU, or a CPU. In some embodiments, identifying the compute processor resources eligible to perform the compute task includes determining which FPGAs can perform the compute task (e.g., by analyzing bitstreams associated with services mapped to FPGAs) and which ASICs can perform the compute task. In various embodiments, this information is stored in scheduler/router 104 of FIG. 1.

Certain compute tasks may only be programmed for certain compute processor resources. For example, if GIF resizing occurs very frequently, it may be determined that it should only be implemented on ASICs and that enough ASICs should be deployed to meet a large demand. Furthermore, some functions/algorithms have higher performance gains associated with certain compute processor resources (e.g., due to the parallelization achievable on the different types of compute processor resources), making those compute processor resources particularly suited for those functions/algorithms.

At 306, based on an optimization metric, one of the compute processor resources is selected to perform the compute task. In some embodiments, scheduler/router 104 of FIG. 1 formulates the optimization metric as a cost function to be minimized. For example, power of computation could be used as an optimization metric/included in a cost function (e.g., selecting the compute processor resource that is associated with the lowest power consumption). Power consumption could be calculated based on computation time and average power consumption of various compute processor resources (e.g., cost=power*time). Computation time alone may also be used as the optimization metric.

Delay in returning results to a user can also be used as the optimization metric/included in the cost function. In some embodiments, if there is an idle compute processor resource that is eligible to perform the compute task, use of that resource first would likely minimize the delay (unless an occupied eligible compute resource can perform the compute task faster and can start the compute task with minimal delay). If there are no idle resources, then the delay may be calculated by multiplying expected execution time for the compute task by queue depth (number of compute task requests already placed) for each of the occupied resources. In some embodiments, delay in returning results and power consumption are both included in a cost function (e.g., assigned weights and summed). In some scenarios, delay in returning results is not used as an optimization metric nor included in the cost function. This may be the case in situations in which the results will be returned to the user within a specified acceptable timeframe (e.g., when returning results is not time sensitive, queue depths are not long enough to incur unacceptable delays, etc.).

In some embodiments, to select a compute processor resource for a compute request, the lowest cost function resource is depleted first. For example, suppose that multiple GIF resizing requests are made and that CPU, GPU, FPGA, and ASIC resources are all eligible to perform GIF resizing. If the cost function includes only power consumption (power consumption being the optimization metric), then ASICs (typically the most power efficient resource) would likely be depleted first, followed by FPGAs, GPUs, and CPUs (assuming FPGAs, GPUs, and CPUs have the next lowest cost functions in that order). In some embodiments, this could mean queueing up the ASICs first, then FPGAs, etc. Queue depth (associated with delay in returning results) may also be part of the optimization metric/cost function. For example, if the most power efficient compute processor resource (suppose an ASIC) has a high queue depth, the high queue depth may increase the cost function value associated with the ASIC to such an extent that another compute processor resource has a lower cost function value. In some embodiments, queues may be lengthened, shortened, and/or reshuffled (e.g., if FPGAs are dynamically reallocated).

In some embodiments, a global optimization is performed to minimize a cost function that considers a plurality of compute requests being serviced by the server system. For example, suppose a first to arrive compute request and a second to arrive compute request can both be serviced by either a GPU or CPU. Instead of assigning the first to arrive compute request immediately to the lowest cost function resource (e.g., the GPU), a global optimization may be performed to minimize an overall cost function that combines the first to arrive compute request and the second to arrive compute request. For example, the global optimization may indicate that the second to arrive compute request incurs such a high cost if performed by the CPU that it should be assigned to the GPU (and the first to arrive compute request assigned to the CPU) in order to minimize the overall cost function.

Figure 4:
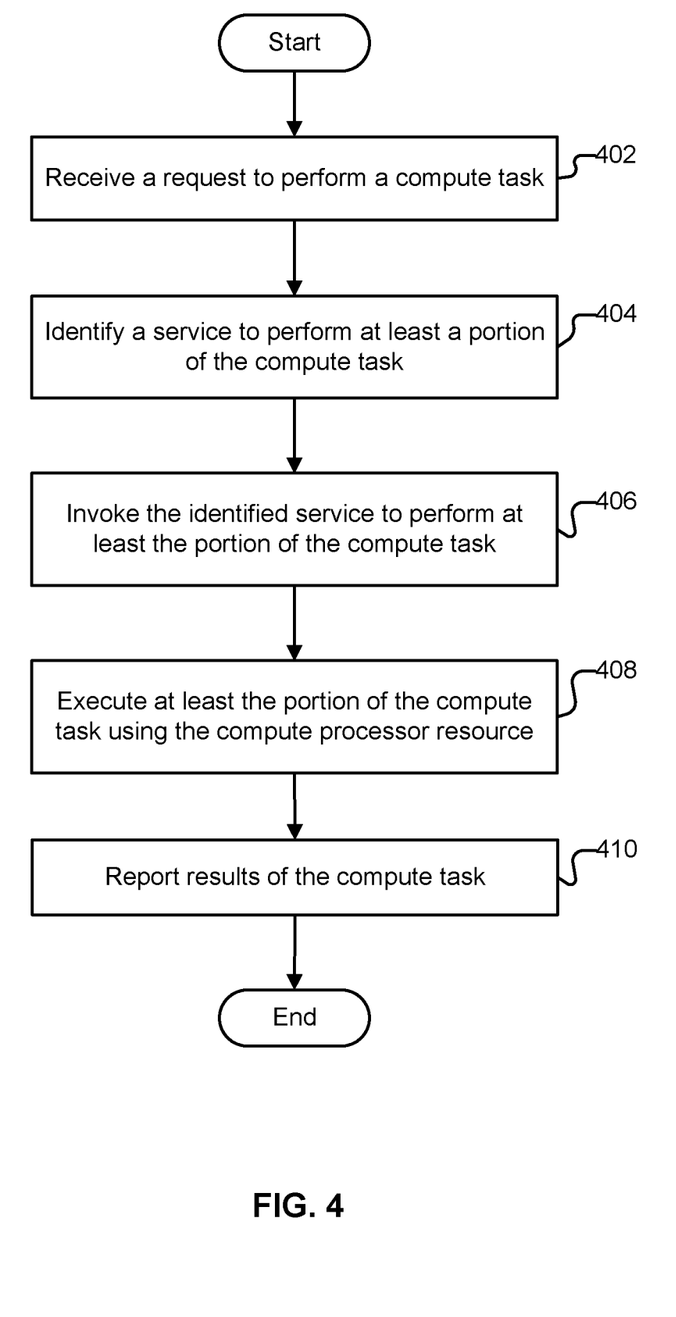
FIG. 4 is a flowchart illustrating an embodiment of a process for performing a compute task using a compute processor resource.

FIG. 4 is a flowchart illustrating an embodiment of a process for performing a compute task using a compute processor resource. In some embodiments, this process is performed by server system 100 of FIG. 1.

At 402, a request to perform a compute task is received. In some embodiments, the request originates from a customer/user that is exposed to an API endpoint (e.g., API A 102 or API B 120 of FIG. 1). The customer/user may be a software program that invokes other ancillary software programs (e.g., via APIs). The customer/user software may request some type of compute task to return a compute result by making a function call to the API (e.g., making a library function call). In various embodiments, the customer/user is not aware of the implementation details associated with returning the compute result.

At 404, a service to perform at least a portion of the compute task is identified, wherein the identified service is associated with a compute processor resource that has been programmed to perform at least the portion of the compute task. In some embodiments, the identified service is a software interface associated with the compute processor resource (e.g., a hardware interface software unit in server system 100 of FIG. 1). The identified service is associated with a specified compute task that is to be executed using the compute processor resource. In some embodiments, a scheduler/router identifies the service from among many services. In some embodiments, identifying the service includes receiving the request to perform the compute task (e.g., an RPC message), identifying compute processor resources that implement the compute task, considering resource management factors (e.g., load balancing) to determine a service to assign to execute the compute task, and sending a request to perform the compute task to the identified service.

At 406, the identified service is invoked to perform at least the portion of the compute task. In some embodiments, hardware interface software (e.g., hardware interface software of server system 100 of FIG. 1) receives a request to perform a compute task from a scheduling unit (e.g., scheduler/router 104 of FIG. 1). In some embodiments, the hardware interface software invokes a compute processor resource to perform at least the portion of the compute task. In some embodiments, invoking the identified service includes receiving a request message, decoding the request message, converting the request message into data in a hardware format, and sending the converted data to the hardware.

At 408, at least the portion of the compute task is executed using the compute processor resource. In some embodiments, one of the compute processor resources in server system 100 of FIG. 1 executes the compute task. For example, if the compute task is to resize a GIF image, an FPGA in server system 100 of FPGA that has already been programmed to perform GIF resizing may receive data in the form of the original GIF image and a desired new GIF size (as extracted from an original request message received by a software component associated with the FPGA). The output of the FPGA would be the output of the compute task (e.g., a resized GIF image), which is ultimately reported back to the requestor of the compute task.

At 410, results of the compute task are reported. In various embodiments, reporting results of the compute task to the requestor of the compute task is the reverse process of forwarding a request for the compute task from the requestor to the compute processor resource executing the compute task. In some embodiments, reporting the results of the compute task includes transferring result data from the compute processor resource to the service associated with the compute processor resource, constructing an API response object, and forwarding the API response object up to the requestor of the compute task.

Figure 5:
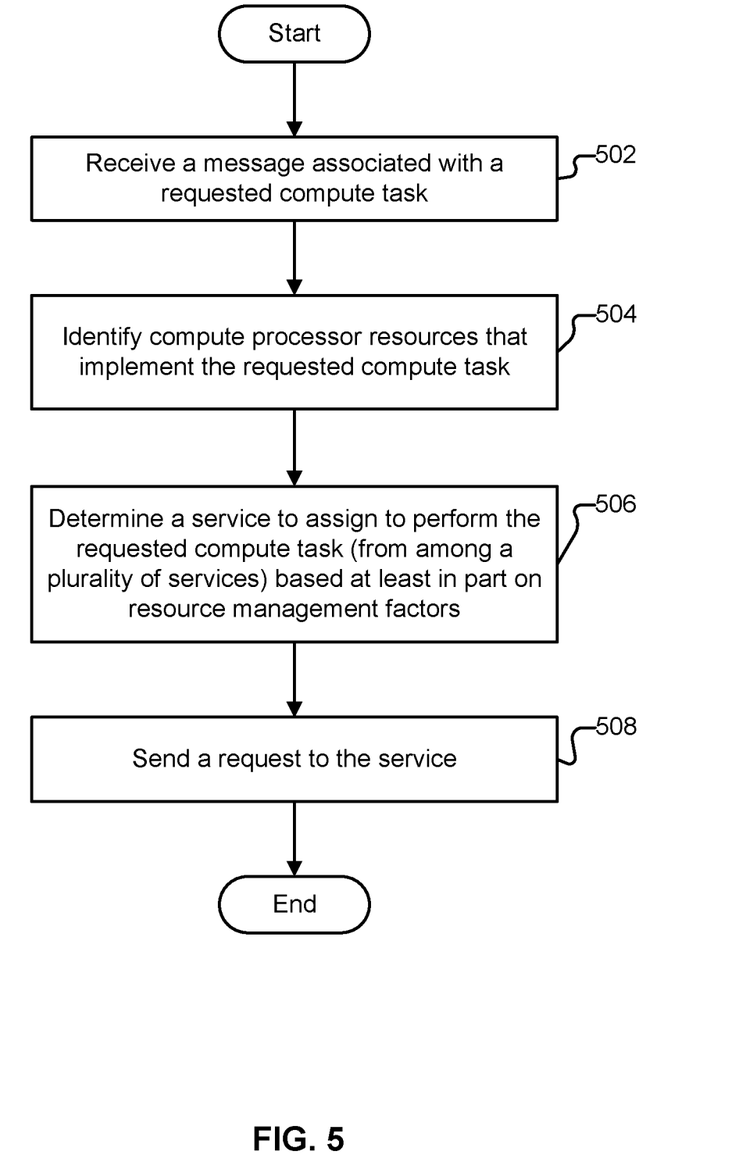
FIG. 5 is a flowchart illustrating an embodiment of a process for identifying a service to perform at least a portion of a compute task.

FIG. 5 is a flowchart illustrating an embodiment of a process for identifying a service to perform at least a portion of a compute task. In various embodiments, the service is identified from among a plurality of services, and each service is associated one-to-one with a compute processor resource that has been programmed to perform at least the portion of the compute task. In some embodiments, the process of FIG. 5 is performed by scheduler/router 104 of FIG. 1. In some embodiments, at least a portion of the process of FIG. 5 is performed in 404 of FIG. 4.

At 502, a message associated with a requested compute task is received. For example, the message may be an RPC message associated with a compute task function call sent by a customer/user of an API (e.g., API A 102 or API B 120 of FIG. 1). A function with parameters and data (e.g., GIF_output=resizeGIF(GIF_input, result_size)) may be called. In various embodiments, the function call is encoded into a message format (e.g., RPC message) that is received by a scheduler/router (e.g., scheduler/router 104 of FIG. 1). For example, an RPC message with input data (e.g., original GIF image) and input parameters (e.g., desired resulting GIF size) encoded into the RPC message can be created.

At 504, compute processor resources that implement the requested compute task are identified. For example, in server system 100 of FIG. 1, the various ASICs and FPGAs in the server system implement various compute tasks (e.g., some may implement GIF resizing, others may implement video encoding tasks, audio encoding tasks, natural language processing tasks, encryption tasks, and so forth), which scheduler/router 104 of FIG. 1 can track (e.g., as services associated with the hardware resources).

At 506, a service to assign to perform the requested compute task is determined based at least in part on resource management factors. For example, if a first service and a second service implement GIF resizing and the first service is currently occupied but the second service is idle, a resource management strategy may be to assign the requested compute task to the second service. If both the first service and the second service are occupied, load balancing may be considered. For example, both the first service and the second service may have queues of already assigned tasks, in which case the service with the shortest queue may be assigned to perform the requested compute task (e.g., the requested compute task is added to the shorter queue).

At 508, a request to the service is sent. If the service is already processing another request, the request that is sent to the service may be queued with the service (e.g., queued to be sent to hardware resources as they become available). Alternatively, the request may be queued before being sent to a service (e.g., queued with scheduler/router 104 of FIG. 1) and released from the queue to the service when the service and the hardware resource associated with the service become available.

Figure 6:
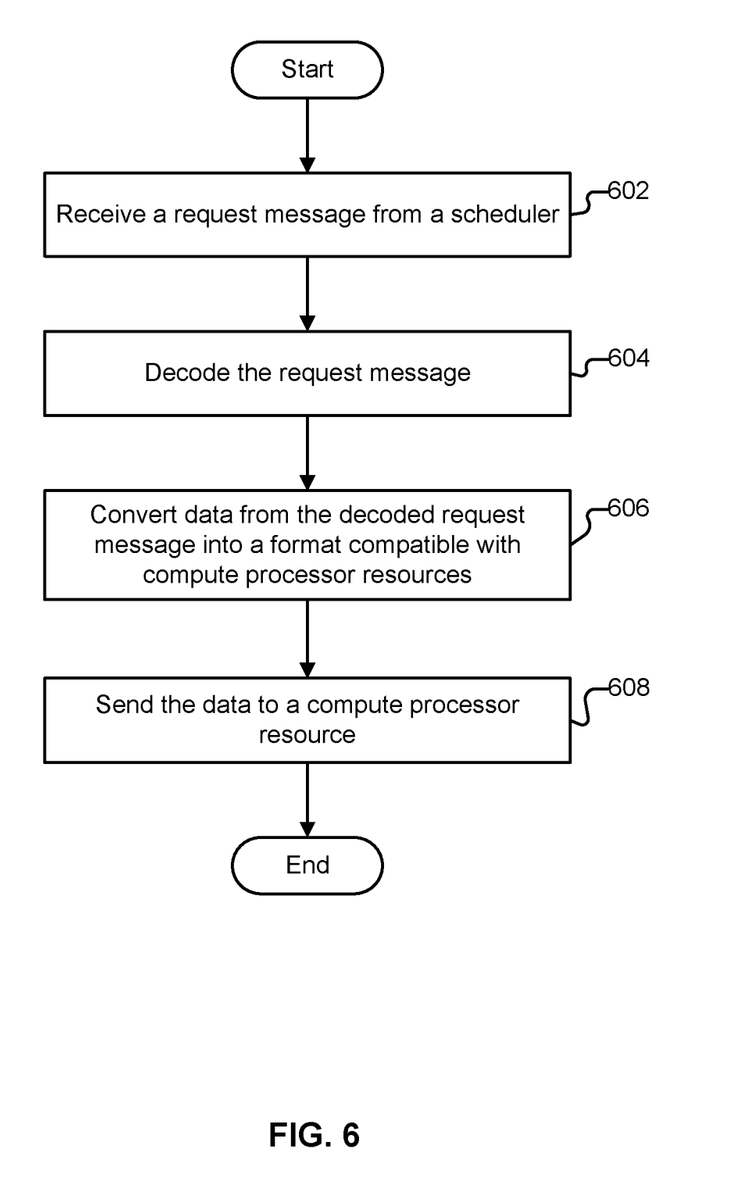
FIG. 6 is a flowchart illustrating an embodiment of a process for invoking a service to perform at least a portion of a compute task.

FIG. 6 is a flowchart illustrating an embodiment of a process for invoking a service to perform at least a portion of a compute task. In some embodiments, the process of FIG. 6 is performed by hardware interface software (e.g., hardware interface software 106, 122, 132, 142, etc. of FIG. 1). In some embodiments, at least a portion of the process of FIG. 6 is performed in 406 of FIG. 4.

At 602, a request message is received from a scheduler. In some embodiments, the scheduler is scheduler/router 104 of FIG. 1. In some embodiments, the request message is a forwarded RPC message associated with a compute task function call originally sent by a customer/user of an API (e.g., API A 102 or API B 120 of FIG. 1). The request message includes data and parameters associated with the compute task (e.g., in an encoded format). For example, in the case of GIF resizing, an RPC message includes input data (e.g., original GIF image) and input parameters (e.g., desired resulting GIF size). In some embodiments, the request message is received by a service (e.g., service 108, 124, 134, 144, etc. of FIG. 1). In some embodiments, the service queues the request until a compute processor resource to perform the compute task is ready to begin the compute task.

At 604, the request message is decoded. In some embodiments, the request message is decoded by a service (e.g., service 108, 124, 134, 144, etc. of FIG. 1). For example, an RPC message associated with a GIF resizing compute task may be decoded by extracting the GIF data (original GIF image) and desired resulting GIF size parameter. The decoding may be performed by keeping only the portions of the message containing the desired data (e.g., ignoring message headers and other metadata). This may be accomplished by the service determining the structure of the request message from a header portion or the service already knowing the structure when it receives the request message.

At 606, data from the decoded request message is converted into a format compatible with compute processor resources. In some embodiments, a driver (e.g., driver 112, 128, 138, 148, etc. of FIG. 1) converts the data from the decoded request message into a format compatible with the compute processor resources. The format of the data (e.g., image data, numeric parameter values, etc.) to be sent to a compute processor resource depends on the format the compute processor resource is expecting for a specified compute task. For example, a compute processor resource that implements GIF resizing may expect GIF image data in a certain row and column format. In addition, the compute processor resource may expect numeric data (e.g., GIF pixel values and desired resulting image dimensions) in a specific numeric format (e.g., binary, decimal, hexadecimal, etc.).

At 608, the data is sent to a compute processor resource. In some embodiments, the data is sent on a bus (e.g., wire, optical, fiber, etc.). The data may be sent using a serial connection, parallel connection, etc.

Figure 7:
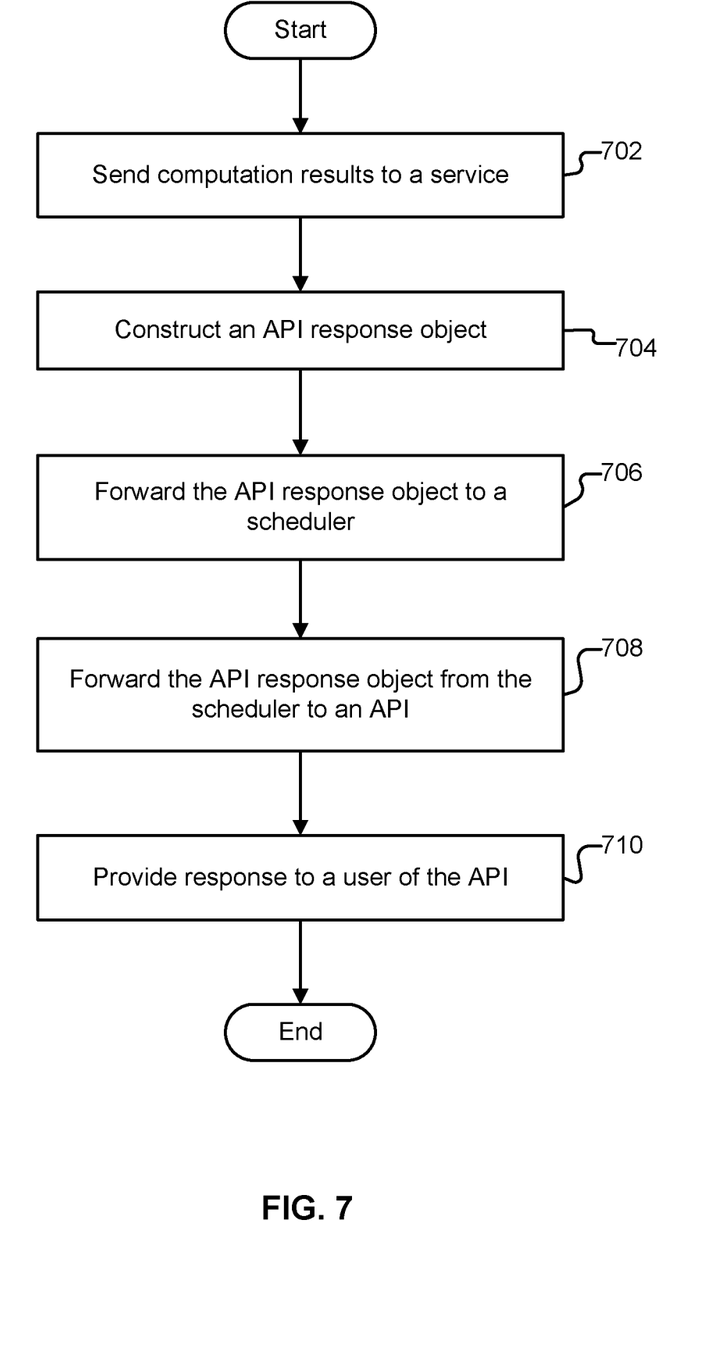
FIG. 7 is a flowchart illustrating an embodiment of a process for reporting results of a compute task.

FIG. 7 is a flowchart illustrating an embodiment of a process for reporting results of a compute task. In some embodiments, the process of FIG. 7 is performed by server system 100 of FIG. 1. In some embodiments, at least a portion of the process of FIG. 7 is performed in 410 of FIG. 4.

At 702, computation results are sent to a service. For example, computation results from Type A FPGA 114 of FIG. 1 may be sent to service 108 of FIG. 1. In some embodiments, this is the reverse of step 608 in FIG. 6 in which input data is sent from the service to the compute processor resource.

At 704, an API response object is constructed. In some embodiments, this is performed by the service that receives the computation results. For example, service 108 in FIG. 1 may encode the computation results (e.g., a resized GIF image) into an API object that can serve as a response to an RPC message. In some embodiments, this is the reverse of steps 604 and 606 in FIG. 6 in which a request message (e.g., an RPC message) is decoded and converted into a format compatible with compute processor resources.

At 706, the API response object is forwarded to a scheduler. In some embodiments, the scheduler is scheduler/router 104 of FIG. 1. In various embodiments, the API response object is forwarded to the scheduler because the scheduler is the link to where the request to perform the compute task originated. In some embodiments, the request to perform the compute task originated from a user making a call to an API (e.g., API A 102 or API B 120 of FIG. 1).

At 708, the API response object is forwarded from the scheduler to an API. The API (e.g., API A 102 or API B 120 of FIG. 1) that receives the API response object is the API that initially received the call from a user to perform a compute task and converted the user's call to a request message (e.g., RPC message) sent to a service associated with a compute processor resource.

At 710, a user of the API is given a response. In various embodiments, the API gives the response to the user in the format the user is expecting. For example, if the user made a GIF resizing call, such as GIF_output=resizeGIF (GIF_input, result_size), to the API, the API would need to return to the user GIF_output (e.g., a new GIF image). The API can extract the data that needs to be returned from the API response object. In various embodiments, a result is returned to the API caller as though the computation had occurred in place locally (without the user needing to know of any RPC message sent to a server system).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a request to perform a compute task;
identify a plurality of compute processor resources eligible to perform the compute task, wherein the plurality of compute processor resources includes a field-programmable gate array and an application-specific integrated circuit; and
based on a cost function that includes power consumption and delay in returning results of the compute task of one of the plurality of computer processor resources, dynamically select one of the compute processor resources to perform the compute task, wherein the power consumption is calculated based on an expected computation time of the compute task and an average power consumption of the one of the plurality of compute processor resources, and wherein the delay in returning results is calculated by multiplying the expected computation time of the compute task by a request queue depth for the compute task of the one of the plurality of compute processor resources; and
the compute processor resources.

2. The system of claim 1, wherein the processor is configured to dynamically select one of the compute processor resources to perform the compute task including by being configured to select a compute processor resource associated with a lowest cost function.

3. The system of claim 1, wherein the processor is configured to dynamically select one of the compute processor resources to perform the compute task based at least in part on minimizing a cost function associated with a plurality of compute requests.

4. The system of claim 1, wherein the processor is configured to dynamically select one of the compute processor resources to perform the compute task including by being configured to select a first available compute processor resource capable of performing the compute task.

5. The system of claim 1, wherein the request to perform the compute task is received via an application programming interface.

6. The system of claim 1, wherein the request to perform the compute task originates from a software application.

7. The system of claim 1, wherein the processor is configured to identify the plurality of compute processor resources eligible to perform the compute task based as least in part on a determination of which compute processor resources are available to perform the compute task.

8. The system of claim 1, wherein the processor is configured to identify the plurality of compute processor resources eligible to perform the compute task based as least in part on a determination of which compute processor resources have been configured to perform the compute task.

9. The system of claim 1, wherein the processor is configured to identify the plurality of compute processor resources eligible to perform the compute task from among compute processor resources distributed across multiple server clusters.

10. The system of claim 1, wherein the selected compute processor resource is configured using a driver to perform the compute task.

11. The system of claim 1, wherein the compute processor resources are located in a single server cluster.

12. The system of claim 1, wherein the compute processor resources are located across multiple server clusters.

13. The system of claim 1, wherein the processor is further configured to report a result associated with performing the compute task.

14. The system of claim 13, wherein the result is formatted as an application programming interface response object.

15. The system of claim 1, wherein field-programmable gate array compute processor resources are configured to be automatically reprogrammed to execute a different type of compute task.

16. A system, comprising:
a processor configured to:
- receive a first request to perform a first compute task;
- identify a first plurality of compute processor resources eligible to perform the first compute task, wherein the first plurality of compute processor resources includes a field-programmable gate array and an application-specific integrated circuit;
- based on a cost function that includes power consumption and delay in returning results of the compute task of one of the plurality of computer processor resources dynamically select one of the first plurality of compute processor resources to perform the first compute task, wherein the power consumption is calculated based on an expected computation time of the first compute task and an average power consumption of the one of the plurality of compute processor resources, and wherein the delay in returning results is calculated by multiplying the expected computation time of the first compute task by a request queue depth for the first compute task of the one of the plurality of compute processor resources;
- receive a second request to perform a second compute task, wherein the second compute task is a different type of compute task than the first compute task;
- identify a second plurality of compute processor resources eligible to perform the second compute task, wherein the second plurality of compute processor resources includes two or more of the following: a field-programmable gate array, an application-specific integrated circuit, a graphics processing unit, or a central processing unit; and
- based on a cost function that is based at least in part on one or more computational properties of the two or more compute processor resources of the second plurality of compute processor resources, dynamically select one of the second plurality of compute processor resources to perform the second compute task;

the first plurality of compute processor resources; and
the second plurality of compute processor resources.

17. The system of claim 16, wherein the processor is configured to dynamically select one of the first plurality of compute processor resources to perform the first compute task including by being configured to select a compute processor resource associated with a lowest cost function.

18. The system of claim 16, wherein the processor is configured to dynamically select one of the first plurality of compute processor resources to perform the first compute task including by being configured to select a first available compute processor resource capable of performing the first compute task.

19. A method, comprising:
- receiving a request to perform a compute task;
- identifying a plurality of compute processor resources eligible to perform the compute task, wherein the plurality of compute processor resources includes a field-programmable gate array and an application-specific integrated circuit; and
- based on a cost function that includes power consumption and delay in returning results of the compute task of one of the plurality of computer processor resources, dynamically selecting one of the compute processor resources to perform the compute task, wherein the power consumption is calculated based on an expected computation time of the compute task and an average power consumption of the one of the plurality of compute processor resources, and wherein the delay in returning results is calculated by multiplying the expected computation time of the compute task by a request queue depth for the compute task of the one of the plurality of compute processor resources.

20. The method of claim 19, further comprising:
dynamically selecting one of the compute processor resources to perform the compute task including by being configured to select a compute processor resource associated with a lowest cost function.

* * * * *